(12) United States Patent
Pardo et al.

(10) Patent No.: US 10,287,505 B2
(45) Date of Patent: May 14, 2019

(54) METHOD FOR THE HYDROTHERMAL CARBONISATION OF A BIOMASS AND ASSOCIATED DEVICE

(71) Applicant: SUEZ INTERNATIONAL, Paris la Defense (FR)

(72) Inventors: Pierre Emmanuel Pardo, Orsay (FR); Jean-Louis Bourdais, Chateaubriant (FR)

(73) Assignees: SUEZ INTERNATIONAL, Paris la Défense (FR); TERRANOVA ENERGY GMBH, Düsseldorf (DE)

( * ) Notice: Subject to any disclaimer, the term of this patent is extended or adjusted under 35 U.S.C. 154(b) by 93 days.

(21) Appl. No.: 15/318,371

(22) PCT Filed: Oct. 29, 2015

(86) PCT No.: PCT/IB2015/058360
§ 371 (c)(1),
(2) Date: Dec. 13, 2016

(87) PCT Pub. No.: WO2016/071808
PCT Pub. Date: May 12, 2016

(65) Prior Publication Data
US 2017/0233659 A1    Aug. 17, 2017

(30) Foreign Application Priority Data
Nov. 4, 2014  (FR) ..................................... 14 60617

(51) Int. Cl.
*C10B 53/02*  (2006.01)
*C10B 1/02*   (2006.01)
(Continued)

(52) U.S. Cl.
CPC ................ *C10B 53/02* (2013.01); *C10B 1/02* (2013.01); *C10B 47/00* (2013.01); *C10B 57/06* (2013.01);
(Continued)

(58) Field of Classification Search
CPC ......... C10B 53/02; C10B 57/06; C10B 47/00; C10B 1/02
See application file for complete search history.

(56) References Cited

U.S. PATENT DOCUMENTS

2011/0056125 A1* 3/2011 Antonietti ............... C10B 53/02
44/605

FOREIGN PATENT DOCUMENTS

| EP | 2 388 305 A2 | 11/2011 |
| WO | 2008/095589 A1 | 8/2008 |
| WO | 2009/127727 A1 | 10/2009 |

OTHER PUBLICATIONS

International Search Report, dated Jan. 20, 2016, from corresponding PCT application.

* cited by examiner

*Primary Examiner* — Brian A McCaig
(74) *Attorney, Agent, or Firm* — Young & Thompson

(57) ABSTRACT

Disclosed is a method for heating a biomass moving along an industrial treatment line including an inlet (1) for the incoming biomass, a heating unit (4), and a treatment station (5). A fraction of the biomass heated by the heating unit (4) is returned along a return branch (R) to a mixing station (2) upstream of the heating unit (4) so as to form, together with the incoming biomass, a mixture having a temperature above the temperature of the incoming biomass, the heated biomass fraction being removed at an outlet (51) of the treatment station (5).

20 Claims, 4 Drawing Sheets

Figure 1:
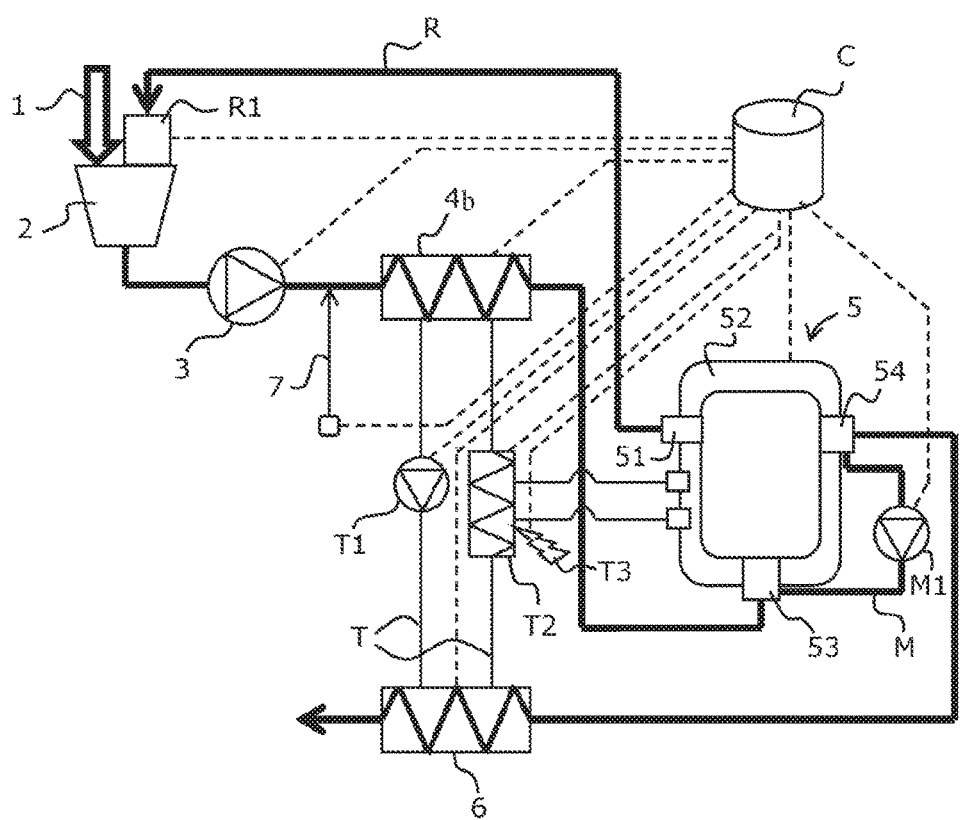

(51) Int. Cl.
_C10B 47/00_ (2006.01)
_C10B 57/06_ (2006.01)
_C10L 9/08_ (2006.01)

(52) U.S. Cl.
CPC ........... _C10L 9/086_ (2013.01); _C10L 2290/02_ (2013.01); _C10L 2290/06_ (2013.01); _C10L 2290/10_ (2013.01); _C10L 2290/141_ (2013.01); _C10L 2290/30_ (2013.01); _C10L 2290/46_ (2013.01); _C10L 2290/50_ (2013.01); _Y02E 50/10_ (2013.01); _Y02E 50/14_ (2013.01); _Y02E 50/30_ (2013.01)

METHOD FOR THE HYDROTHERMAL CARBONISATION OF A BIOMASS AND ASSOCIATED DEVICE

TECHNICAL FIELD

The present invention relates to the field of the thermal and chemical treatment of a biomass such as sludge derived from a wastewater treatment system.

The present invention relates more particularly to a process for the hydrothermal carbonization of a biomass and also to a device for implementing such a process.

PRIOR ART

A hydrothermal carbonization process typically consisting in subjecting a biomass to a temperature close to 200° C., and to a pressure close to 20 bar, is known in the prior art.

Patent EP 2 388 305 A2 describes a facility comprising a treatment line in which a biomass is circulated, this line comprising in particular a heat exchanger and a reactor. The heat exchanger is arranged so as to heat the biomass circulating in the line by means of a transfer circuit in which a transfer fluid circulates. After having been preheated in this heat exchanger, the biomass is then carbonized in the reactor in which it spends an average residence time of approximately 4 hours.

Patent EP 2 388 305 A2 also reports results of tests according to which the injection of an additive such as glycerol into the biomass makes it possible to significantly reduce the viscosity of this biomass and to significantly promote the increase in temperature of the mixture comprising the biomass and the additive in the reactor.

Such a hydrothermal carbonization facility or process has several drawbacks:
- the reactor must provide energy to increase the temperature of the biomass,
- the residence time of the biomass in the reactor involves stirring the biomass in the reactor in order to ensure the heat exchange and to make the heating uniform,
- the temperature gradient between the heating surface of the reactor and the biomass promotes sedimentation of the biomass, requiring the use of a mixer-scraper in order to remove the biomass deposit on the internal walls of the reactor, the mixer-scraper also implying maintenance costs and constituting, in addition, a part that is a risk to personnel and a part that reduces the reliability of the facility,
- the residence time inherent in the heating of the biomass in the reactor limits the volume of biomass that the facility can treat and makes it necessary to increase the volume of the reactor in order to treat more biomass,
- the increase in temperature of the biomass in the heat exchanger is limited by the relatively high viscosity of the biomass entering the facility; by way of indication, a dehydrated sludge is at least ten times more viscous than water,
- the thermal characteristics of a biomass of purification sludge type imply high injection pump powers and thus a high electrical energy cost.

The aim of the present invention is in particular to overcome all or some of these drawbacks by providing a process for heating a biomass, and also a device for implementing such a process, optimizing the heat exchanges and exploiting the thermal energy produced by the implementing of such a process or the operating of such a device.

SUMMARY OF THE INVENTION

To this effect, the present invention provides a process for heating a biomass moving along an industrial treatment line comprising an inlet for the incoming biomass, a heating means and a treatment station, a fraction of the biomass heated by the heating means being returned along a return branch to a mixing station upstream of the heating means so as to form there, with the incoming biomass, a mixture having a temperature above the temperature of the incoming biomass, the heated biomass fraction being removed at an outlet of the treatment station.

Such a process makes it possible to reduce the viscosity of the biomass upstream of the heating means compared with a process which does not perform such a return. This results in a decrease in the pressure drop in the line and an improvement in the gain in thermal heat exchange at the level of the heating means. This results in a greater increase in temperature of the biomass.

Advantageously, the biomass is a purification sludge, preferably dehydrated purification sludge, and the treatment is a hydrothermal carbonization.

Indeed, purification sludge, in particular dehydrated purification sludge, has relatively poor heat exchange coefficients, that is to say coefficients which are unfavorable to the increase in temperature of said sludge and which entail very large equipment sizes. The process according to the invention makes it possible to improve the exchange coefficients of such a sludge.

According to one particularly advantageous characteristic, the heating means is controlled using a control means so that the temperature of the biomass reaches a parameterized temperature before it arrives in the treatment station, the parameterized temperature being between 165° C. and 205° C., preferably 185° C.

In this way, the temperature of the biomass when it arrives in the treatment station is sufficiently high, in particular when the treatment is a hydrothermal carbonization, to avoid having to further increase the temperature of the biomass in the treatment station. This makes it possible to dispense with the heating function of the treatment station, and thus to eliminate the temperature gradient in the treatment station resulting from such a function. Consequently, a process which has such a characteristic makes it possible to limit the sticking by baking (or depositing) of the biomass on walls of the treatment station, such sticking or depositing possibly resulting in an interruption of the heat exchanges in the treatment station. It also makes it possible to dispense with any means or operation intended to limit such sticking or depositing (for example, a scraping and/or mixing operation).

Another advantage of the elimination of the heating function of the treatment station is that, for a given amount of biomass to be treated, the volume of the treatment station can be reduced, since there is no longer any need for the residence time of the biomass, in the treatment station, associated with the heating function.

According to a first variant of the invention, the biomass is pressurized between the mixing station and the heating means, and the pressure of the biomass fraction is lowered in the return branch.

The reduction in pressure of the biomass fraction circulating in the return branch generates vapor which propagates in the biomass entering the mixing station and condenses as it migrates, while heating the incoming biomass. The condensation of the vapor of this biomass fraction circulating in the return branch is made possible by the fact that the biomass in the mixing station is under the influence of atmospheric pressure, the mixture being pressurized in the line downstream of the mixing station. Furthermore, the vibration generated by the reduction in pressure prevents the biomass located in the mixing station from doming, promoting mixing.

According to one particularity of the invention, the biomass fraction reduced in pressure and the incoming biomass undergo a mechanical mixing operation (for example using a mixer). Such an operation even further promotes mixing.

Advantageously, the flow rate of the biomass fraction returned to the mixing station is adjusted according to the amount of incoming biomass contained in the mixing station.

According to one particularity, the return of biomass fraction is controlled such that this fraction is effectively returned to the mixing station only when incoming biomass is present in the mixing station.

According to a second variant of the invention, the biomass is pressurized upstream of the mixing station, and the pressure of the fraction in the return branch is raised.

This second variant has the advantage of returning the biomass fraction to the line while mixing it with the incoming biomass that has already been pressurized, avoiding the use of an energy dissipater for lowering the pressure of the fraction in the return branch.

According to an advantageous characteristic, the pressure of the biomass upstream of the heating means is raised to a value which makes it possible to heat the mixture to a temperature above 100° C. without boiling.

According to another advantageous characteristic, the pressure at the pressurizing pump outlet is greater than 3 MPa.

These characteristics allow a controlled raising of the temperature of the biomass.

Advantageously, according to a first variant of the invention, the line also comprises a cooling station downstream of the treatment station, and a transfer fluid is heated in its path between the cooling station and the heating means.

Very advantageously, the transfer fluid is heated to a temperature above that of the biomass at the treatment station. The heat transferred at the heating means can thus heat the biomass to said parameterized temperature before it arrives in the treatment station.

According to a very advantageous characteristic, one and the same external heat source is used to heat the transfer fluid and a heat-exchange fluid which maintains the temperature of the biomass at the treatment station.

Advantageously, the external heat source may consist of a boiler burner.

According to a second advantageous variant of the invention, heat is recovered from the biomass downstream of the treatment station and this recovered heat is transferred to the biomass upstream of the treatment station. Preferably, heat is recovered from the biomass downstream of the treatment station and this recovered heat is transferred to the biomass upstream of the treatment station by means of a means of (direct or indirect) heat exchange between the biomass leaving the treatment station and the biomass circulating in the line upstream of the treatment station.

According to one advantageous characteristic of the invention, the process comprises a step of injecting an additive into the biomass upstream of the heating means.

The additive injected can consist of any catalyst capable of decomposing organic matter, for example an acid, such as sulfuric acid, or a catalyst as described in patent EP 2 388 305 A2.

Such an injection step also contributes to reducing the viscosity of the biomass and to thus promoting its increase in temperature, and also makes it possible to reduce fouling phenomena in the line.

Alternatively, the injecting step can be carried out downstream of or within the heating means.

According to another advantageous characteristic of the invention, a portion of the biomass is removed from the treatment station by means of a recirculation branch and this portion is returned to the treatment station so as to generate movement of the biomass in the treatment station.

Such a removal and return of biomass portion from and to the treatment station makes it possible to limit the sticking or depositing of the biomass in the treatment station, and to dispense with any means or operation intended to limit such sticking or depositing.

Advantageously, the biomass portion is removed with a flow rate which is between 5 and 15 times the flow rate of biomass entering the treatment station.

The invention also relates to a device for implementing a process according to various combinations of the characteristics which have just been described, this device comprising an industrial treatment line comprising:
  an inlet arranged so as to cause incoming biomass to enter the line,
  a pressurizing pump arranged so as to move the biomass in the line,
  a heating means capable of heating the biomass,
  a treatment station capable of maintaining the biomass approximately at a temperature of entry into the treatment station, the treatment station being installed downstream of the heating means,
  a means for at least indirect heat exchange between the biomass leaving the treatment station and the biomass circulating in the line upstream of the treatment station,
  a return branch capable of transferring a biomass fraction from a treatment station outlet to a mixing station.

The expression "at least indirect" is intended to mean an indirect or direct heat exchange means, as for example illustrated in the embodiments described below.

Preferably, the device also comprises injection means capable of injecting an additive into the line.

According to one advantageous characteristic, the heat exchange means comprises:
  a transfer circuit in which a transfer fluid circulates so as to heat the biomass in the heating means by heat exchange between the transfer fluid and the biomass, and
  means for circulating the transfer fluid, preferably a pump, capable of circulating the transfer fluid in the transfer circuit.

According to another advantageous characteristic, the device also comprises an external heat source arranged so as to heat the transfer fluid and a heat-exchange fluid circulating in a jacket of the treatment station.

According to yet another advantageous characteristic, the return branch comprises a pressure-lowering device, preferably a regulator, for example of diaphragm or pump or valve type, for lowering the pressure of the biomass circulating in the return branch.

Very advantageously, the biomass enters the treatment station via a lower part and leaves therefrom via an upper part.

The device can be arranged so that the biomass enters the treatment station via a lower part and leaves therefrom via an upper part.

A biomass, in particular where it consists of a purification sludge, is more dense than environmental water. The solid fraction, surrounded by undissolved organic matter, will thus have a tendency, through the effect of gravity, to lie at a lower height compared with the fractions that are already solubilized and thus for which the carbonization reactions are ongoing or have already taken place. The residence time of a non-carbonized biomass fraction in the treatment station is thus increased, compared with a device which causes the biomass to enter via an upper part and causes it to leave via a lower part.

The relative increase in the residence time of the biomass in the treatment station makes it possible to increase the quality of the treatment.

According to one very advantageous characteristic, the device according to the invention also comprises a recirculation branch arranged so as to remove a portion of biomass from the treatment station and to return this portion of biomass to the treatment station.

Very advantageously, the treatment station comprises a partition arranged so as to convey a liquid biomass fraction to the return branch.

The presence of mineral matter in the biomass fraction circulating in the return branch is thus limited, thereby reducing the risks of damage by abrasion in particular of the pressurizing pump and of the heating means.

According to one advantageous characteristic, the treatment station is mechanically passive, that is to say it does not comprise a scraper or a mixer.

Such parts are parts that are a risk to personnel and to the availability of the facility.

Advantageously, the treatment station is a hydrothermal carbonization reactor for purification sludges.

DESCRIPTION OF THE FIGURES AND EMBODIMENTS

Figure 2:
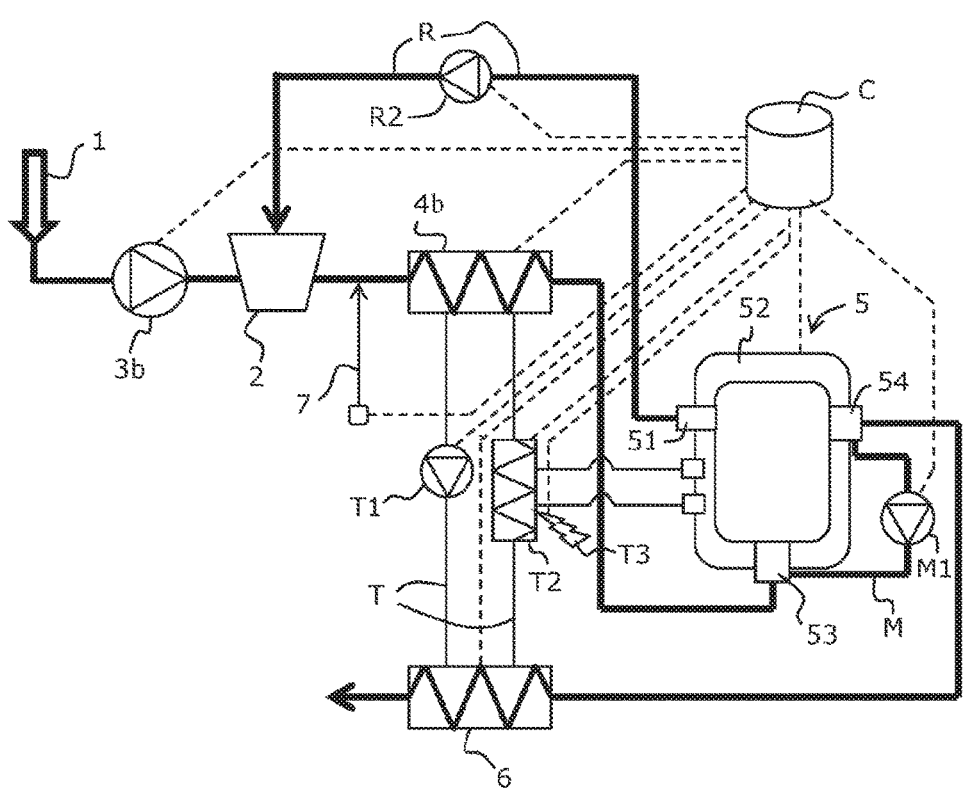
Figure 3:
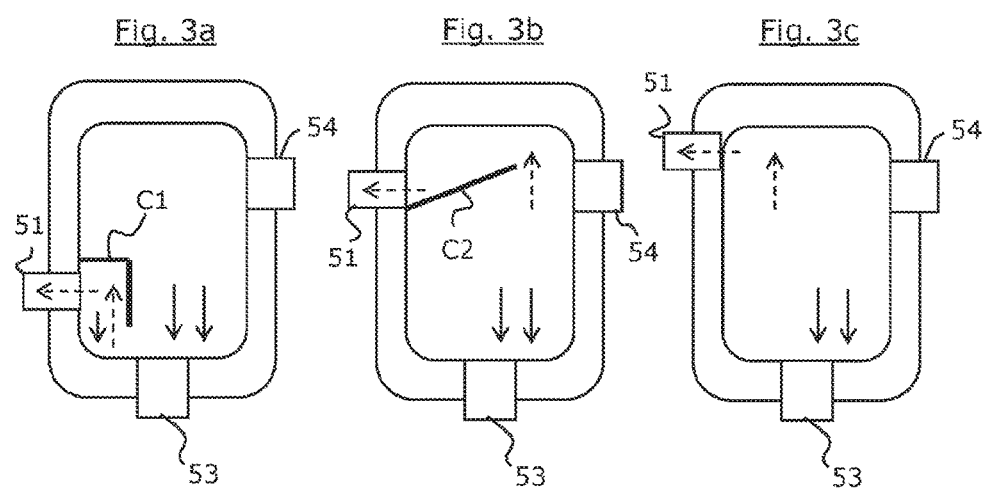
Figure 4:
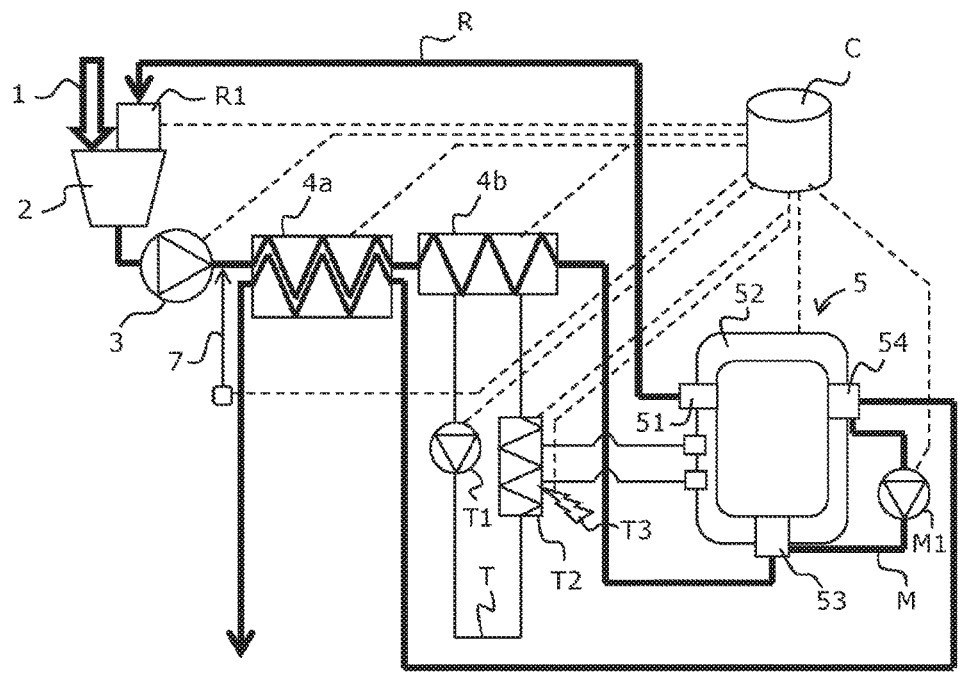

Other advantages and particularities of the invention will emerge on reading the detailed description of implementations and embodiments that are in no way limiting, and the following appended drawings:

FIG. 1 is a diagrammatic view of a hydrothermal carbonization device according to the invention comprising a pressurizing pump between a mixing station and a heating means, FIG. 2 is a diagrammatic view of a hydrothermal carbonization device according to the invention comprising a pressurizing pump upstream of the mixing station, FIGS. 3a, 3b and 3c are diagrammatic views of a treatment station comprising:
a siphon-shaped partition (FIG. 3a),
a deflector (FIG. 3b),
a recirculation outlet in the top position (FIG. 3c), FIG. 4 is a diagrammatic view of a hydrothermal carbonization device according to the invention comprising a direct heat exchange means.

Since the embodiments described hereinafter are in no way limiting, it will in particular be possible to consider variants of the invention comprising only a selection of features described, isolated from the other features described (even if this selection is isolated within a phrase comprising these other features), if this selection of features is sufficient to confer a technical advantage or to distinguish the invention with respect to the prior art. This selection comprises at least one feature, which is preferably functional without structural details, or with only a part of the structural details if this part only is sufficient to confer a technical advantage or to distinguish the invention with respect to the prior art.

FIG. 1 illustrates a preferred embodiment of the invention.

According to this embodiment, the device according to the invention comprises an industrial treatment line in which the biomass circulates.

Incoming biomass, for example dehydrated purification sludge, enters via an inlet 1 in the line where it is introduced into a mixing station 2. The mixing station 2 is preferably a closed silo capable of containing an amount of biomass of several cubic meters, under atmospheric pressure.

The mixing station 2 preferably comprises a feed pump (not represented) for filling the mixing post 2 with biomass and a feed screw (not represented) arranged so as to introduce biomass contained in the mixing station into piping connecting the mixing station 2 to a heating means 4, this piping comprising a pressurizing pump 3 between the mixing station 2 and the heating means 4.

The pressurizing pump 3 makes it possible to circulate the biomass in the line.

More specifically, the pressurizing pump 3 is of a type capable of raising the pressure of the biomass at the outlet of pump 3 to a value greater than 3 MPa (piston pump, membrane pump or the like).

Under the effect of the pressurizing pump 3, the biomass is conveyed from the pressurizing pump 3 to the heating means 4.

The heating means 4 is preferably a heat exchanger.

This heating means 4 makes it possible to heat the biomass by heat exchange between a transfer fluid circulating in a transfer circuit T and the biomass passing through the heating means 4. To do this, the transfer fluid, for example oil, is itself heated by means of an external heat source T3, this heat source being, for example, a boiler burner.

Piping also connects the heating means 4 to a treatment station 5 to which the biomass is conveyed.

The treatment station 5 is preferably a reactor comprising a chamber capable of receiving biomass and of maintaining this biomass at a pressure typically of between 2 and 3 MPa.

In one preferred embodiment, the sole function of the treatment station 5 is to ensure a residence time that makes it possible to subject the biomass to chemical reactions, typically hydrolysis reactions. For this reason, the treatment station 5 can alternatively consist of a baffled or non-baffled, tubed or non-tubed reactor, or for example of a reactor in the form of a tube of sufficient length to ensure the required residence time.

According the embodiment represented in FIGS. 1 and 2, the biomass coming from the heating means 4 enters the chamber for the treatment station 5 via a lower part 53, that is to say via a part of the treatment station 5 of which the height is substantially the lowest relative to the installation of the treatment station 5 in the area housing the device.

According to the embodiments of FIGS. 1 and 2, piping also connects the treatment station 5 to a cooling station 6.

According to these same embodiments, after a residence time, the (hydrolyzed) biomass leaves the chamber of the treatment station 5 via an upper part 54, from where it is conveyed to the cooling station 6. The term "upper part 54" is intended to mean a part of the treatment station 5 of which the height is substantially the highest relative to the installation of the treatment station 5 in the area housing the device, as opposed to the lower part 53.

Alternatively, the biomass may also enter the treatment station 5 via an upper part and leave therefrom via a lower part.

According to yet another alternative, the biomass may also enter the treatment station 5 via a lower part and be conveyed from this lower part to an upper part of the chamber by a pipe, the biomass being able to leave the chamber of the treatment station 5 via a lower part.

A biomass fraction contained in the treatment station 5 is transferred to the mixing station 2 by a return branch R. This transferred biomass fraction is preferably removed at an outlet 51 of the treatment station 5 arranged so that the biomass fraction removed preferentially contains a liquid portion rather than a solid portion.

Various means are preferentially used for removing such a fraction.

In the example represented in FIG. 3a, the chamber comprises a siphon-shaped partition C1 which makes the biomass change direction before reaching the outlet 51 (located low down). Such a partition C1 causes a decrease in the solid portion (represented by solid-line arrows) in the fraction recirculated, the inertia of the solid portion promoting the liquid-portion selection phenomenon (represented by dashed-line arrows) so as to constitute the biomass fraction reaching the outlet 51. In another example represented in FIG. 3b, the outlet 51 is located at a medium height and the selection of liquid portion is carried out by means of a partition of deflector type C2.

In the example represented in FIG. 3c, the outlet 51 is located at a relatively high height, naturally promoting the selection of liquid portion so as to constitute the biomass fraction conveyed to this outlet 51.

As represented in FIG. 1, the biomass fraction circulating in the return branch R is subjected to the action of a pressure-lowering device R1 before it arrives in the mixing station 2. This pressure-lowering device R1 is for example a regulator of diaphragm, pump or valve type.

The feed of the biomass fraction reduced in pressure by the pressure-lowering device R1 is preferably located above the feed screw.

Preferably, the flow rate of the biomass fraction passing through the pressure-lowering device R1 is regulated by any appropriate control means C such that this flow rate is non-zero only if the mixing station 2 contains a sufficient amount of incoming biomass, for example at a height of 1 to 2 meters.

The pressure-lowering device R1 thus reduces the pressure of the biomass fraction removed from the treatment station 5, which has the effect of creating a vapor of this biomass fraction, which propagates in the incoming biomass contained in the mixing station 2 while condensing and consequently heating this incoming biomass.

If necessary, it is envisioned to add a mixer (not represented) in addition to the feed screw.

The cooling station 6 is preferably a heat exchanger.

The cooling station 6 makes it possible to cool the biomass leaving the treatment station 5 by heat exchange between the transfer fluid circulating in the transfer circuit T and the biomass passing through this cooling station 6.

Thus, the transfer circuit T connects the heating means 4 to the cooling station 6. It thus constitutes, with the heating means 4 and the cooling station 6, a means of heat exchange between the biomass leaving the treatment station 5 and the biomass circulating in the line upstream of the treatment station 5.

As illustrated in FIGS. 1 and 2, the transfer fluid is circulated in the transfer circuit T by circulation means T1, typically a pump.

An external heat source T3, for example a boiler burner, heats the transfer fluid at the level of the heat exchanger T2. The biomass circulating in the heating means is heated by the transfer fluid thus heated from which it takes a part of its heat.

The transfer fluid also recovers a part of the heat from the biomass circulating in the cooling station 6.

Alternatively, according to one embodiment represented in FIG. 4, a part of the heat from the biomass circulating in the line downstream of the treatment station 5 is transferred to the biomass circulating in a heat-recovery device 4a installed upstream of the heating means 4b. In this case, the heat exchange means performs a direct heat exchange between the biomass leaving the treatment station 5 and the biomass circulating in the line upstream of the treatment station 5, by means of a heat-recovery device 4a.

In one preferred embodiment, the chamber of the treatment station 5 is surrounded by a jacket 52 in which a heat-exchange fluid is circulated.

This heat-exchange fluid is heated to and maintained at a temperature capable of maintaining the biomass contained in the chamber at the temperature it had before it entered the treatment station 5, that is to say when the biomass was between the heating means 4 and the treatment station 5, and capable of compensating for the heat losses associated with the structure of the treatment station 5.

The heating of the heat-exchange fluid is preferably carried out by the same external heat source T3 as that which heats the transfer fluid, at the level of the heat exchanger T2. The transfer fluid and the heat-exchange fluid can thus be one and the same fluid, for example oil, circulating in circuitry arranged so as to heat the transfer fluid (circulating in the circuit T) and the heat-transfer fluid (circulating in the jacket 52) to the desired temperatures. The differential control of the temperature of the transfer fluid and of the heat-exchange fluid is carried out by any appropriate means, for example valves (not represented) mounted on said circuitry and a control of the opening and closing of these valves and also of the heat source T3.

In order to increase the temperature of the biomass in the line at the heating means 4, the device is controlled, for example by the control means C, such that the heat source T3 raises the transfer fluid to a temperature above that of the biomass contained in the treatment station 5, for example to a temperature close to 210° C.

In order to limit the phenomenon of depositing of biomass on the walls of the chamber of the treatment station 5, while at the same time using a mechanically passive treatment station 5 (that is to say one without scraper and/or mixer), the treatment station 5 preferably comprises a recirculation branch M which makes it possible to circulate the biomass in the chamber. To do this, biomass is preferably suctioned in the upper part 54 (the biomass being more fluid therein) and this biomass is reinjected into the chamber via a lower part 53. Preferably, the flow rate of this recirculation is proportioned such that the biomass circulating in the recirculation branch M is removed with a flow rate of between 5 and 15 times the flow rate of biomass entering the treatment station 5 from the heating means 4. Such recirculation ensures good homogeneity of the temperature of the biomass contained in the treatment station 5.

The circulating of this biomass in the recirculation branch M is preferably ensured by a membrane pump M1, which is preferably sealed and offset from the treatment station 5.

Such a pump M1 thus installed increases the reliability of the device, since this pump M1 can for example be repaired or maintained without having to take the entire device out of service.

Preferably, an additive is injected into the biomass in the line, preferably upstream of the heating means 4, 4b, by any appropriate injection means 7, in order to even further decrease the viscosity of the biomass.

It is seen that the various solutions proposed by the present invention make it possible to decrease the viscosity of the biomass and consequently to promote an increase in its temperature by reduced means.

The surface area of the heat exchangers (heating means 4, 4b and/or cooling station 6), the piping diameters and also the volume of the treatment station 5 can thus be reduced.

In one embodiment represented in FIG. 2, the pressurizing pump 3b is installed between the inlet 1 and the mixing station 2.

In this latter configuration (FIG. 2), the biomass circulating in the return branch R is introduced at a point of the line subjected to a pressure above atmospheric pressure. A raising pump R2 is thus installed in the return branch R in order to withstand the loss of pressure involved in using the return branch R.

In one embodiment that is not represented, the raising pump R2 is installed between the mixing station 2 and the heating means 4.

Of course, the invention is not limited to the examples that have just been described, and many adjustments can be made to these examples without departing from the context of the invention. Furthermore, the various features, forms, variants and embodiments of the invention can be combined with one another according to various combinations insofar as they are not incompatible or exclusive with respect to one another.

The invention claimed is:

1. A process for heating a biomass moving along an industrial treatment line comprising an inlet (1) for the incoming biomass, a heating means (4b) and a treatment station (5), the biomass moving along the industrial treatment line from the inlet (1) to the heating means (4b) and, heated, into the treatment station (5), and out an outlet (51) of the treatment station (5), a fraction of the biomass heated by the heating means (4b) being returned along a return branch (R) to a mixing station (2) upstream of the heating means (4b) so as to form there, with the incoming biomass incoming into the inlet (1), a mixture having a temperature above the temperature of the incoming biomass incoming into the inlet (1), the heated biomass fraction being removed at the outlet (51) of the treatment station (5), wherein heat is recovered from the biomass downstream of the treatment station (5), wherein this recovered heat is transferred to the biomass upstream of the treatment station (5) by a heat recovery device (4a) between the biomass leaving the treatment station (5) and the biomass circulating in the line upstream of the treatment station (5).

2. The process as claimed in claim 1, wherein the biomass is a purification sludge and is being treated by hydrothermal carbonization.

3. The process as claimed in claim 1, wherein the heating means (4b) is controlled so that the temperature of the biomass reaches a parameterized temperature before it reaches the treatment station (5), the parameterized temperature being between 165° C. and 205° C.

4. The process of claim 3, wherein the parameterized temperature is 185° C.

5. The process as claimed in claim 1, wherein the biomass mixture is pressurized between the mixing station (2) and the heating means (4b), and wherein the pressure of the biomass fraction is reduced in the return branch (R).

6. The process as claimed in claim 5, wherein the flow rate of the heated biomass fraction returned to the mixing station (2) is adjusted according to the amount of incoming biomass contained in the mixing station (2).

7. The process as claimed in claim 5, wherein the pressure of the incoming biomass mixture upstream of the heating means (4b) is raised to a value which makes it possible to heat the mixture to a temperature of greater than 100° C. without boiling.

8. The process as claimed in claim 7, wherein the pressure at a pressurizing pump (3, 3b) outlet is greater than 3 MPa.

9. The process as claimed in claim 1, wherein the incoming inlet biomass is pressurized upstream of the mixing station (2), and wherein the pressure of the heated biomass fraction is raised in the return branch (R).

10. The process as claimed in claim 1, wherein the line also comprises a cooling station (6) downstream of the treatment station (5), and wherein a transfer fluid is heated in its path between the cooling station (6) and the heating means (4b).

11. The process as claimed in claim 10, wherein the transfer fluid is heated to a temperature above that of the biomass at the treatment station (5).

12. The process as claimed in claim 10, wherein one and the same external heat source (T3) is used to heat the transfer fluid and a heat-exchange fluid which ensures that the temperature of the biomass at the treatment station (5) is maintained.

13. The process as claimed in claim 1, further comprising a step of injecting an additive into the biomass mixture upstream of the heating means (4b).

14. The process as claimed in claim 1, wherein a second fraction of the biomass is removed from the treatment station (5) by means of a recirculation branch (M) and this part is returned to the treatment station (5) so as to generate movement of the biomass in the treatment station (5).

15. The process as claimed in claim 14, wherein the part of biomass is removed with a flow rate of between 5 and 15 times the flow rate of biomass entering the treatment station (5).

16. A device for implementing a process as claimed in claim 1, further comprising an industrial treatment line comprising:
   an inlet (1) arranged so as to cause incoming biomass to enter the line,
   a pressurizing pump (3) arranged so as to move the biomass in the line,
   a heating means (4b) capable of heating the biomass,
   a treatment station (5) capable of maintaining the biomass substantially at a temperature of entry into the treatment station (5), the treatment station (5) being installed downstream of the heating means (4b),
   a heat recovery device that exchanges heat between biomass leaving the treatment station (5) and biomass circulating in the line upstream of the treatment station (5) and a return branch (R) capable of transferring a biomass fraction from an outlet (51) of the treatment station (5) to a mixing station (2).

17. The device as claimed in claim 16, wherein the heat recovery device comprises:

a transfer circuit (T) in which a transfer fluid circulates so as to heat the biomass in the heating means (4*b*) by heat exchange between the transfer fluid and the biomass, and means of circulating (T1) the transfer fluid, capable of circulating the transfer fluid in the transfer circuit (T).

18. The device as claimed in claim 17, further comprising an external heat source (T3) arranged so as to heat the transfer fluid and a heat-exchange fluid circulating in a jacket (52) of the treatment station (5).

19. The device as claimed in claim 16, the device being arranged such that the biomass enters the treatment station (5) via a part (53) that is lower to the ground as compared to a part (54) from which the biomass leaves the treatment station (5).

20. The device as claimed in claim 16, wherein the treatment station (5) comprises a partition (C1, C2) arranged so as to convey a liquid biomass fraction to the return branch (R).

* * * * *